(12) United States Patent
Theobald et al.

(10) Patent No.: US 7,658,149 B2
(45) Date of Patent: Feb. 9, 2010

(54) MINESWEEPING DEVICE

(75) Inventors: Alan Theobald, Pyrmont (AU);
Kenneth George White, Pyrmont (AU)

(73) Assignee: Commonwealth of Australia, Australian Capital Territory (AU)

( * ) Notice: Subject to any disclaimer, the term of this patent is extended or adjusted under 35 U.S.C. 154(b) by 335 days.

(21) Appl. No.: 10/539,538

(22) PCT Filed: Dec. 17, 2003

(86) PCT No.: PCT/AU03/01678

§ 371 (c)(1),
(2), (4) Date: Feb. 5, 2007

(87) PCT Pub. No.: WO2004/054873

PCT Pub. Date: Jul. 1, 2004

(65) Prior Publication Data

US 2007/0142231 A1    Jun. 21, 2007

(30) Foreign Application Priority Data

Dec. 18, 2002    (AU) ................................ 2002953407

(51) Int. Cl.
*B63G 7/06*    (2006.01)
(52) U.S. Cl. ........................................ 102/402; 89/1.13
(58) Field of Classification Search ................ 89/1.13; 114/337, 338; 102/402
See application file for complete search history.

(56) References Cited

U.S. PATENT DOCUMENTS

| 5,425,001 | A | * | 6/1995 | Polvani ....................... 367/131 |
| 5,446,433 | A | * | 8/1995 | Laskaris et al. ............. 335/216 |
| 5,461,873 | A | * | 10/1995 | Longsworth ................. 62/51.1 |
| 5,530,413 | A | * | 6/1996 | Minas et al. ................. 335/216 |
| 5,552,211 | A | * | 9/1996 | Ackermann et al. ......... 428/209 |
| 5,552,372 | A | * | 9/1996 | Ackermann et al. ......... 505/163 |
| 5,598,152 | A | | 1/1997 | Scarzello et al. |
| 5,724,820 | A | | 3/1998 | Iwasa |
| 5,917,393 | A | * | 6/1999 | Kupiszewski et al. ....... 335/216 |
| 6,213,021 | B1 | | 4/2001 | Pickett |

(Continued)

FOREIGN PATENT DOCUMENTS

EP    475834    3/1992

(Continued)

OTHER PUBLICATIONS

"International Application Serial No. PCT/AU2003/001678, International Search Report mailed Jan. 30, 2004", 2 pgs.

(Continued)

*Primary Examiner*—Bret Hayes
(74) *Attorney, Agent, or Firm*—Schwegman, Lundberg & Woessner, P.A.

(57) ABSTRACT

A magnetic signature minesweeping device (10) comprising a water driven turbine power generator (12) and a superconducting material magnet (14), wherein the turbine power generator is arranged, in use, to supply a driving current for the superconducting material magnet (14) when the minesweeping device is towed through the water. In a further embodiment a control unit (24) is arranged, in use, to control the magnetic output of the superconducting magnet (14) and the power output of the turbine power generator (12). Furthermore a method of minesweeping using the device (10), and an array of the devices (10) is disclosed.

33 Claims, 3 Drawing Sheets

U.S. PATENT DOCUMENTS

| | | | |
|---|---|---|---|
| 6,378,312 B1 * | 4/2002 | Wang | 62/6 |
| 6,510,604 B1 * | 1/2003 | Pourrahimi | 29/599 |
| 6,622,494 B1 * | 9/2003 | Pourrahimi | 62/51.1 |
| 6,634,273 B2 | 10/2003 | Cangelosi | |
| 7,052,339 B2 * | 5/2006 | Abdel-Maksoud et al. | 440/47 |
| 2005/0215129 A1 * | 9/2005 | Abdel-Maksoud et al. | 440/38 |

FOREIGN PATENT DOCUMENTS

| | | |
|---|---|---|
| JP | 57-30688 | 2/1982 |
| JP | 6397488 | 4/1988 |
| JP | 6-024381 | 2/1994 |

OTHER PUBLICATIONS

"Japanese Patent Application No. 2004-559485, Notification of Reasons for Refusal dated Aug. 13, 2008" (w/ English Translation), 7 pgs.

* cited by examiner

MINESWEEPING DEVICE

CLAIM OF PRIORITY

This application is a U.S. National Stage Filing under 35 U.S.C. 371 from International Patent Application No. PCT/AU2003/001678 filed on Dec. 17, 2003, and published in English as WO 2004/054873 A1 on Jul. 1, 2004, which claims priority under 35 U.S.C. §119(a)-(d) or 365(b) of Australian Application No. 20029543407 filed Dec. 18, 2002, which applications and publication are incorporated herein by reference.

FIELD OF THE INVENTION

The present invention relates broadly to a minesweeping device and to a method of minesweeping, in particular in respect of magnetic signature minesweeping.

BACKGROUND OF THE INVENTION

Magnetic signature minesweeping systems typically comprise permanent magnets, conventional electromagnets or conducting loops to generate magnetic fields for simulating magnetic signatures of water vessels. The purpose of magnetic signature minesweeping systems is to trigger underwater mines by simulating the magnetic signatures of vessels, which is one of the detonation trigger techniques deployed by certain types of underwater mines. Another type of magnetic signature minesweeping system may also be arranged to generate a signature which is known to trigger a specific type of mine. Such minesweeping systems are towed from a range of platforms, including ships and helicopters.

Current minesweeping systems incorporating permanent magnets have the disadvantage of being very heavy structures, and, in general, are difficult if not impossible to sport by air because of potential interference with navigational compasses. Furthermore, they have limited options on source strength and orientation with respect to direction of advance of the minesweeping system.

Other current minesweeping systems incorporating conventional electromagnets tend to require power generators on board the tow platforms and tow cables which involve power down the cable, which then tend to result in fairly large cable structures. As a result, substantial bollard pull capability is required on the tow platform, which limits the versatility of such minesweeping systems.

In at least preferred embodiments, the current invention seeks to provide a magnetic signature minesweeping device which addresses one or more of the above disadvantages, or at least provides a useful alternative.

SUMMARY OF THE INVENTION

In accordance with a first aspect of the present invention there is provided a magnetic signature minesweeping device comprising a water driven turbine power generator and a superconducting material magnet, wherein the turbine power generator is arranged, in use, to supply a driving current for the superconducting material magnet when the minesweeping device is towed through the water.

Preferably, the minesweeping device comprises a control unit arranged, in use, to control the magnetic output of the superconducting magnet and the power output of the turbine power generator.

In one embodiment, the minesweeping device further comprises sensor units arranged, in use, to monitor the magnetic output of the superconducting magnet, the magnetic heading of the unit and the power output of the turbine power generator, and further comprises a feedback unit arranged, in use, to supply feedback signals from the sensor unit to the control unit, whereby the magnetic output and power output can be optimised for a specific mine countermeasure task.

Advantageously, the turbine power generator comprises adjustable pitch blades, whereby drag characteristics of the turbine power generator are adjustable. An electrical control could also be used to coarsen the pitch so that the correct voltages and currents are supplied to the power supply. The superconducting material magnet may be disposed as a single axis longitudinal magnetic source or as a three-axis magnetic source. Both single axis and three-axis sources are currently used for minesweeping.

Preferably, the minesweeping device further comprises a communications unit arranged, in use, to enable remote access to the control unit. The communications unit may comprise one or more of a group comprising acoustic, radio, induction or cable format communication devices. Radio communication would be preferred but cable format or a combination of radio and acoustic might be needed if the sweep operates beneath the surface.

Advantageously, the superconducting material magnet comprises a high temperature superconductor (HTS). Multi-Filamentary Composite (MFC) wire BSCCO-2223 ($Bi_2Sr_2Ca_2Cu_3O_{10+\delta}$) and a Coated Conductor Composite (CCC) with YBCO ($YBa_2Cu_3O_{7-\delta}$) coating manufactured by American Superconductor Corporation are examples of HTS that can be used. In one embodiment, the superconducting material magnet is operable at liquid nitrogen temperatures.

Sweeping using the superconducting magnet can be in Mine Setting Mode (MSM) or Target Emulation Mode (TEM). In MSM the mine logic is understood and the superconducting magnet is programmed to produce a magnetic signature that will trigger the mine. In TEM the mine logic is unknown and the superconducting magnet (or a linear towed array of particular superconducting magnets) is programmed to produce a point-by-point copy (emulation) of a ship's magnetic signature. A linear array of one or more superconducting magnets could be used for minesweeping in either MSM or TEM. When sweeping in TEM an array of superconducting magnets is necessary to give the sweep magnetic signature the same dimensions as the magnetic signature of the ship being emulated.

Preferably, the control unit is arranged, in use, such that the magnetic output is variable as a function of time, orientation and/or position, for facilitating generating desired magnetic signatures for simulating vessels.

The minesweeping device may comprise an interface unit for interfacing to one or more other minesweeping devices, wherein the interface unit comprises an electrical output for power "take-off" from the turbine power generator to the other minesweeping devices. The interface unit may be arranged such that, in use, the power take-off is facilitated via a tow and power cable connection to the other minesweeping device.

The other minesweeping devices may comprise further superconducting material magnets.

Preferably, the interface unit further comprises a control interface, whereby the control unit of the mine-sweeping device is capable of controlling the magnetic output of the other minesweeping devices.

The turbine power generator and the superconducting material magnet may be implemented as separate elements arranged, in use, to be connected via a tow and power cable.

In accordance with a second aspect of the present invention there is provided a method of magnetic signature minesweeping utilising a water driven turbine power generator and a superconducting material magnet, wherein the turbine power generator supplies a driving current for the superconducting material magnet when the minesweeping device is towed through the water.

Preferably, the method comprises controlling the magnetic output of the superconducting magnet and the power output of the turbine power generator.

In one embodiment, the method further comprises monitoring the magnetic output of the superconducting magnet, the magnetic heading of the unit and the power output of the turbine power generator, and supplying feedback signals for the controlling of the magnetic output and the power output, whereby the magnetic output and power output can be optimised for a specific mine countermeasure task.

Advantageously, the turbine power generator comprises adjustable pitch blades, whereby drag characteristics of the turbine power generator are adjustable.

The superconducting material magnet may be disposed as a single axis longitudinal magnetic source or as a three-axis magnetic source.

In one embodiment, the superconducting material magnet is arranged such that, in use, it exhibits an output, which emulates both the permanent magnetic component and the variable magnetic component of a ship's magnetic signature.

Preferably, the method further comprises varying the magnetic output, as a function of time and/or position, for facilitating generating desired magnetic signatures for simulating vessels.

The method may further comprise the step of interfacing to one or more other minesweeping devices, wherein the interfacing comprises an electrical output for power "take-off" from the turbine power generator to the other minesweeping devices.

The other minesweeping devices may comprise further superconducting material magnets.

Preferably, the method further comprises controlling the magnetic output of the other minesweeping devices.

The invention extends to a magnetic signature minesweeping arrangement comprising an array of minesweeping devices configured to be towed in a serial array, each of the minesweeping devices including a superconducting material magnet, and at least one of the minesweeping devices including a water driven turbine power generator arranged, in use, to power at least one of the minesweeping devices.

DETAILED DESCRIPTION OF THE EMBODIMENTS

Figure 1:
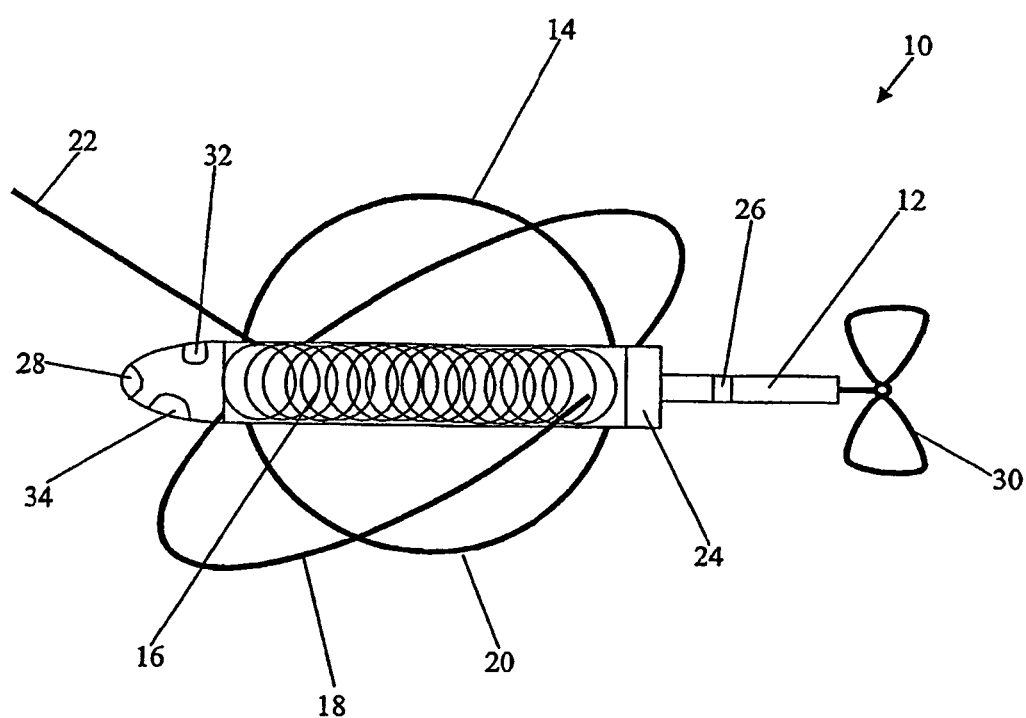
FIG. 1 is a schematic drawing of a single magnetic signature minesweeping device embodying the present invention.

Referring first to FIG. 1, a minesweeping device 10 embodying the present invention integrates a water driven turbine generator 12 with a super conducting material magnet structure 14 in the one vessel. In the embodiment shown in FIG. 1, the superconducting material magnet structure 14 comprises a longitudinal magnet coil structure 16, as well as vertical and athwartship magnet coil structures 18 and 20 respectively. The coil structures are formed from a high $T_c$ superconductor. Multi-Filamentary Composite wire BSCCO-2223 ($Bi_2Sr_2Ca_2Cu_3O_{10+\delta}$) or a Coated Conductor Composite manufactured by American Superconductor Corporation with YBCO ($YBa_2Cu_3O_{7-\delta}$), once commercially available, may be used.

The minesweeping device 10 is connected to a tow cable 22, which does not have to provide power down the cable capabilities due to the on-board power generation utilising the water driven turbine generator 12. It has been recognised by the applicant that superconducting material magnets can provide the required magnetic output strength at electrical power inputs that can be generated through on-board water driven turbine power generators, thus eliminating the need for power down the cable configurations from the tow vessel or vehicle. If the magnet is cooled with liquid nitrogen the power requirements are as low as 100 W or 10% of the power output available from the turbine in current use with the Australian Acoustic Generator known as the AAG, marketed by ADI Limited, at Garden Island NSW 2011, Australia. In one embodiment the superconducting magnet is cooled using a cryocooler to an operating temperature of 20K on board the towing vessel before being placed in the water and towed as a sweep. In this configuration the superconducting material magnet is used as a sweep until its temperature rises to a level that reduces the critical current below a usable value.

The minesweeping device or "sweep" 10 comprises a control unit 24 for controlling the turbine generator 12 and the superconducting material magnet structure 14. Sensors 26, 34 and 28 are further provided to monitor the power output of the turbine 12, the magnetic heading of the sweep and the magnetic output of the magnet structure 14 respectively. It will be appreciated that the data gathered through sensors 34 and 28 can be utilised in a feedback mechanism in the control of the power supply 42 and the magnet structure 14 for operating the minesweeping device 10 for a given mine countermeasures operation, as is shown in more detail in FIG. 3. The sensor 26 can be used to monitor the turbine output, which is controlled by control unit 24 through adjusting the pitch of the turbine blades so that the correct operating currents and voltages are provided to the power supply 42. Further sensors may be provided to monitor the velocity and depth of the sweep.

The variable pitch blades 30 of the turbine 12 are also capable of adjusting/reducing the drag on the tow platform, thereby making the most efficient use of fuel resources on the tow platform. If the turbine speed increases too much the pitch is coarsened to limit the speed of the turbine shaft. The turbine velocity or power output and the magnetic flux output of the magnet are monitored by the control unit, which uses these data to control the turbine blade pitch, which in turn controls the drag on the towing platform.

The minesweeping device 10 further comprises a communications unit 32 for facilitating communication between a command station and the control unit 24. In the example embodiment, the communications unit is arranged for radio communications from the command station, which may be located on the tow platform or at a different remote location. However, it will be appreciated by the person skilled in the art that in different embodiments, communication between the command station and the minesweeping device 10 may be provided through other techniques, including via acoustic, induction or cable formats.

The control unit 24 in the example embodiment is capable of controlling the magnetic output of the magnet structure 14 as a function of time and/or position for facilitating the simulating of a desired magnetic signature. It is believed that this control can enable the minesweeping device 10 to be towed at lower levels above ground/mine location which in turn can reduce the maximum magnetic strength and thus the electrical power required. All magnetic sources look like dipoles from a large distance. The magnetic flux density due to a magnetic dipole falls off inversely as the cube of the distance. If the distance is halved the magnetic flux density is increased by a factor of eight. If the minesweeping device can be towed at a lower level the field requirements can accordingly be drastically reduced.

The ship's magnetic signature has two components, namely an induced component and a permanent component. The ferrous components of a ship have some permanent magnetization acquired both during construction and after construction as a result of mechanical vibrations and changes in temperature while immersed in the Earth's field and an induced magnetization because they concentrate the Earth's magnetic field. This induced magnetization can sometimes add to the permanent magnetization and on other occasions subtract from the permanent magnetization depending upon the ship's orientation in the Earth's field and the position of the ship on the surface of the Earth. To emulate this effect the superconducting material magnet needs to produce a magnetic field, which is the sum of the induced and variable components. This magnetic field will vary depending on the magnet's orientation and position on the Earth's surface. The position on the Earth's surface is not important during the actual sweeping operation because the sweeping will take place in a small area, but if the sweep were transported over large distances to perform sweeping activities in different parts of the world it would be relevant. On the other hand if the orientation of the sweep were to change during sweeping operations the magnetic moment would have to change to reflect changes in sweep orientation. This orientation will be measured by the sensor 34 in the form of a gyroscopic compass and monitored by the control unit 24. For example, from a distance the coil will behave like a dipole. The magnetic field due to a ship can be modelled as an array of dipoles and therefore the signature of the ship can be emulated by an array of one or more superconducting coils. The field, $\overline{B}$, due to a point dipole source with a magnetic moment $\overline{m}$ and position vector $\overline{r}$ is given by:

$$\vec{B} = \left(\frac{\mu_0}{4\pi}\right)\frac{1}{r^3}(3\hat{r}(\hat{r}\cdot\vec{m}) - \vec{m}) \text{ where} \quad (1)$$

$$\vec{m} = m_{LM}\hat{i} + m_{AM}\hat{j} + m_{VM}\hat{k} \quad (2)$$

where LM is the longitudinal magnetization, AM the across-ship magnetization and VM is the vertical magnetization $$m_{LM} = m_{PLM} + M_{ILM}\cos\theta\left(\frac{\cos\phi}{\cos\phi_{Sydney}}\right) \quad (3)$$

where PLM is the permanent longitudinal magnetization and ILM is the induced longitudinal magnetization $$m_{AM} = m_{PAM} + m_{IAM}\sin\theta\left(\frac{\cos\phi}{\cos\phi_{Sydney}}\right) \quad (4)$$

where PAM is the permanent across-ship magnetization and IAM is the induced across-ship magnetization $$m_{VM} = m_{PVM} + m_{IVM}\sin\phi \quad (5)$$

where PVM is the permanent vertical magnetization and IVM is the induced vertical magnetization.

θ=heading

φ=latitude

Figure 3:
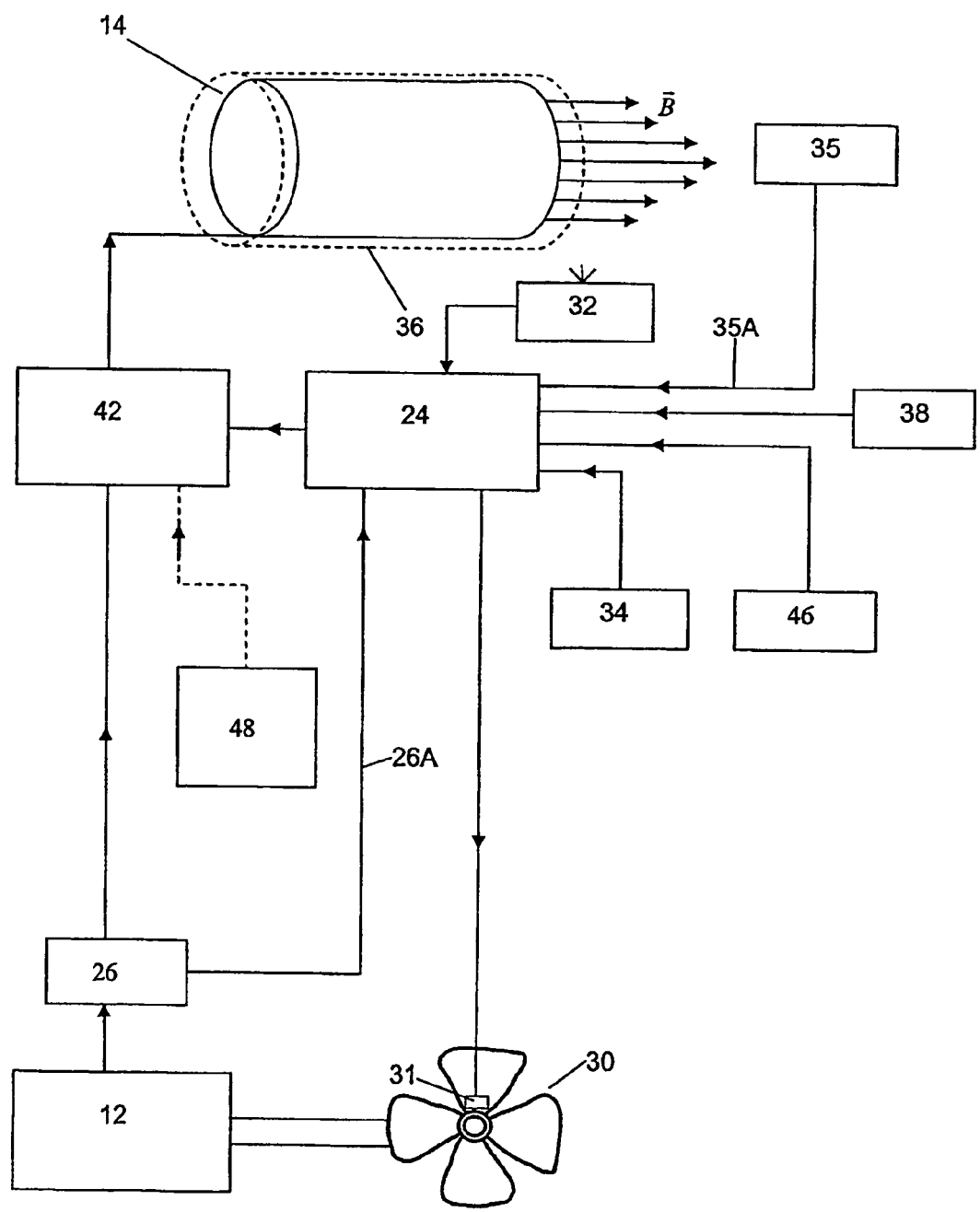
FIG. 3 is a schematic functional block diagram of a feedback control system forming part of the magnetic signature mine-sweeping device of the invention.

The heading is measured using the gyroscopic compass 34 and the latitude measured using the GPS card 38 of FIG. 3. The above example assumes that the numerical values for induced magnetization are based upon measurements taken in Sydney. Angle of dip might give greater accuracy than latitude.

Figure 2:
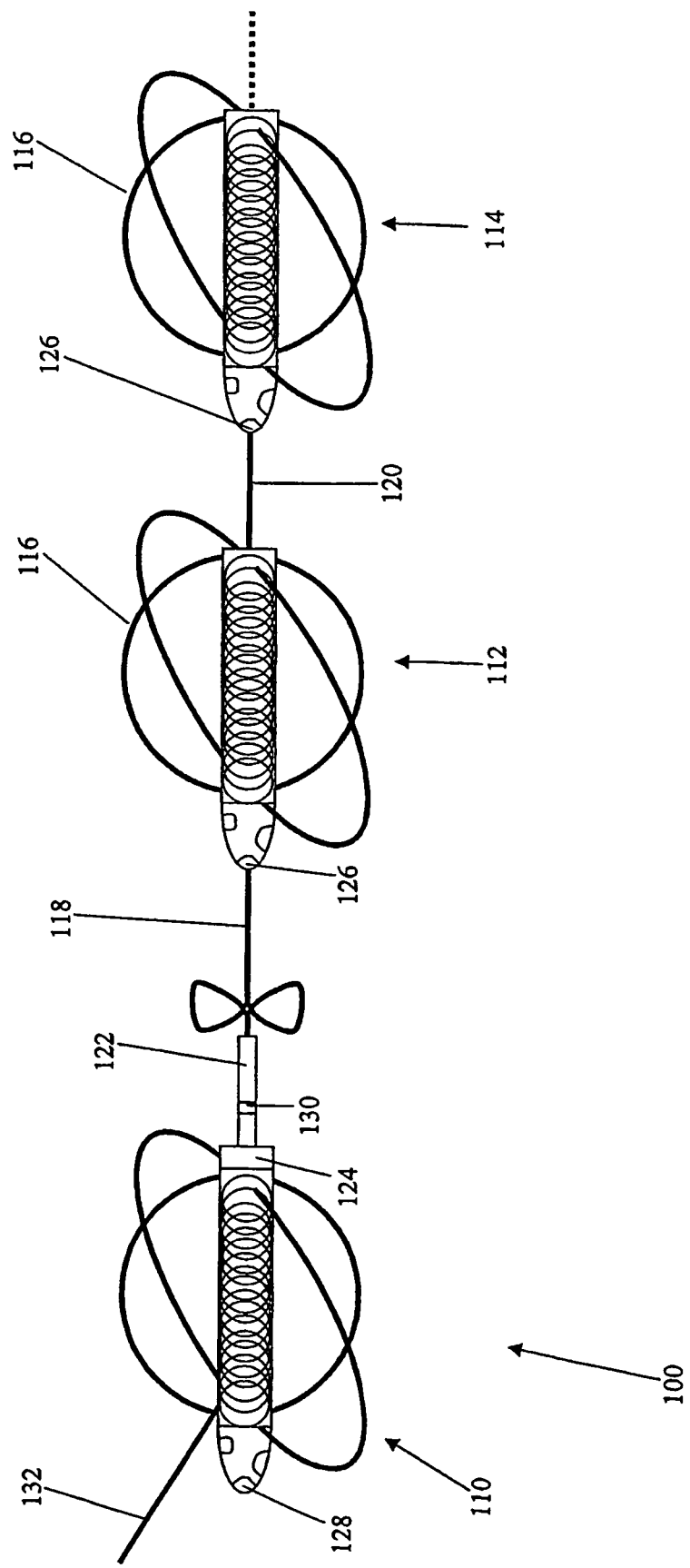
FIG. 2 is a schematic drawing of a multiple magnetic source minesweeping device configuration embodying the present invention.

Turning now to FIG. 2, the present invention can, in another embodiment, be extended to a multiple magnetic source configuration 100. In that configuration, a first or lead minesweeping device 110 of the type previously described with reference to FIG. 1 is used together with a number of separate magnetic source vessels e.g. 112, 114. In the embodiment shown in FIG. 2, the towed array of magnetic source vessels 112, 114 each comprise a superconducting material magnetic structure 116, which is basically identical to the superconducting material magnet structure 14 described above with reference to FIG. 1. Between the lead device 110 and the other vessels e.g. 112, 114, combined tow/power "take-off" cable connections 118, 120 are provided, for power distribution from the turbine 122 of the lead device 110 to the magnet structures 116 of the other vessels e.g. 112, 114. In another configuration the devices can be individually powered or the tailing device can have the turbine, with power being distributed to the leading vessels via the cable connections 118 and 120.

The cable connections 118, 120 also provide control interface communications between the control unit 124 of the lead device 110 and the magnet structures 116 of the other vessels 112, 114. Further communication links are provided via the cable connections 118, 120 for sensor signals obtained from sensor elements 126 of the other vessels 112, 114 to the control unit 124. It will be appreciated by the person skilled in the art that therefore a feedback mechanism can utilise feedback from the other vessels and the lead vessel 110 from its on-board sensors 128, 130 in the control of the power output and magnetic output of the overall minesweeping configuration 100. If the sweep were emulating (copying point by point) the signature of a vessel and the sweep were to change direction this change in direction should be accompanied by a change in magnetic output because the induced component of a ship's signature depends upon the orientation of the ship in the Earth's magnetic field. A velocity sensor or gyroscopic compass 128 detects the change in direction and then communicates the change to the control unit 124. The control unit then uses a look up table including signature characterstics of the target vessels and algorithms based on the above formulae (1) to (5) to adjust the output of the coils to create the new magnetic signature. A look up table may also be provided including the magnetic trigger signatures for triggering identified mines in MSM mode.

The magnetic signatures may also be transmitted to the sweep from the vessel via the communications unit 32.

In another extension of the present invention, the modular nature may be further extended by physically separating the water driven turbine from the superconducting material magnet structure e.g. in the lead device 110, and interconnecting the two elements through a tow and power cable connection, similar to the connections e.g. 118, 120 between the elements of the configuration 100 shown in FIG. 2.

Referring now to FIG. 3 the microprocessor-based control unit 24 monitors the output of the superconducting material magnet (in this example a solenoid or coil) 14 using a three-axis fluxgate magnetometer 35. The superconducting coil 14 is encapsulated in a cryostat 36 to maintain the superconducting material below its critical temperature. A global positioning system (GPS) card 38 is used to determine the position of the sweep on the surface of the Earth. Sensors 34 and 46 monitor the sweep depth and velocity respectively and a gyroscopic compass determines the heading of the sweep. This depth, velocity and heading, together with the output from the GPS card 38 and the output from the fluxgate magnetometer 35 will be relayed back to the control unit 24 which will then adjust the settings of the power supply 42 so that the coil is energised to produce the correct magnetic moment. The power supply 42 rectifies the AC power supplied by the turbine generator 12 and provides DC current to the coil. The control unit 24 monitors the turbine output 26 and controls the pitch of the turbine blades 30 via pitch adjusting servo 31 so as to maintain the correct current and voltage for the power supply 42. Therefore there are two feedback loops, one 35A to control the magnetic moment of the magnet and one 26A to control the pitch of the turbine blades. The control unit 24 adjusts the current supplied by the power supply 42 on the basis of the sensor inputs to energize the coil so that it has the optimum magnetic output or moment and the control unit 24 also controls the pitch of the turbine blades so that the correct operating voltages and currents are supplied to the power supply 42. A rechargeable battery 48 could also be used as a back up in the event of the turbine generator failing or the turbine impeller 30 snaring or jamming.

It will be appreciated by a person skilled in the art that magnetic minesweeping devices embodying the present invention do not require large bollard pull capability in the tow platform used in like prior art conventional electromagnet minesweeping systems, and are readily transportable by air unlike prior art permanent magnet minesweeping systems.

It will further be appreciated by the person skilled in the art that numerous modifications and/or variations may be made to the present invention as shown in the specific embodiments without departing from the spirit or scope of the invention as broadly describe. The present embodiments are, therefore, to be considered in all respects to be illustrative and not restrictive.

The invention claimed is:

1. A magnetic signature minesweeping device comprising:
a superconducting material magnet;
a power supply connection to supply a driving current for the superconducting material magnet;
a control unit to control a magnetic output of the superconducting magnet; and
a heading sensor located in the magnetic signature minesweeping device, the heading sensor in communication with the control unit to monitor a magnetic heading of the device, the control unit further to control the magnetic output of the superconducting material magnet responsive to the magnetic heading, and to cause different magnetic outputs to be provided for different magnetic headings.

2. A device as claimed in claim 1 wherein the minesweeping device comprises a water driven turbine power generator to supply the driving current through said power supply connection and a plurality of sensor units arranged to monitor the magnetic output of the superconducting magnet and the power output of the turbine power generator, and further comprises a feedback arrangement to supply feedback signals from the sensor units to the control unit, wherein the magnetic output and power output can be optimised for a specific mine countermeasure task.

3. A device as claimed in claim 2, wherein the turbine power generator comprises adjustable pitch blades, whereby drag characteristics of the turbine power generator are adjustable.

4. A device as claimed in claim 1, wherein the superconducting material magnet is disposed as a three-axis magnetic source.

5. A device as claimed in claim 1, wherein the minesweeping device further comprises a communications unit arranged to enable remote access to the control unit.

6. A device as claimed in claim 5, wherein the communications unit is selected from a group comprising acoustic, radio, induction and cable format communication devices.

7. A device as claimed in claim 1, wherein the superconducting material magnet comprises a high $T_C$ superconductor.

8. A device as claimed in claim 7, wherein the superconducting material magnet is operable at liquid nitrogen temperatures.

9. A device as claimed in claim 7 wherein the superconducting material magnet is selected from a group of materials including multi-filamentary composite wire BSCCO-2223 ($Bi_2Sr_2Ca_2Cu_3O_{10+\delta}$) and a coated conductive composite incorporating YBCO($YBa_2Cu_3O_{7-\delta}$).

10. A device as claimed in claim 1, wherein the superconducting material magnet is arranged such that it exhibits a permanent magnetic output component and a variable magnetic output component to represent permanent and induced components of a vessel's magnetic signature.

11. A device as claimed in claim 10, wherein the permanent magnetic output component comprises a non-zero permanent vertical magnetisation.

12. A device as claimed in claim 11, wherein the control unit is configured to receive a latitude and controls the permanent vertical magnetisation responsive to the received latitude, causing different permanent vertical magnetisations to be provided for different latitudes.

13. A device as claimed in claim 10, wherein the permanent magnetic output component comprises non-zero permanent longitudinal and across-ship magnetisations.

14. A device as claimed in claim 13, wherein the control unit controls the permanent across-ship magnetisation and the permanent longitudinal magnetisation responsive to the magnetic heading, causing different permanent across-ship magnetisations and different permanent longitudinal magnetisations to be provided for different magnetic headings.

15. A device as claimed in claim 1, wherein the control unit is arranged such that the magnetic output is variable as a function of time and/or position, to facilitate the generation of desired magnetic signatures to emulate vessels, the device including at least one position sensor to which the control unit is responsive.

16. A device as claimed in claim 1, wherein the device is a magnetic signature device operable in target emulation mode (TEM), wherein it emulates the magnetic signature of a particular vessel.

17. A device as claimed in claim 1 wherein the device is operable in mine setting mode (MSM), and is configured to produce a magnetic signature associated with a particular type of mine to trigger said mine.

18. A device as claimed in claim 1, including a power supply connected to the power supply connection, wherein the power supply and the superconducting material magnet are implemented as separate elements arranged to be connected via a tow and power cable.

19. A device as claimed in claim 1, comprising a water driven turbine power generator that supplies the driving current when the minesweeping device is towed through water.

20. A minesweeping system, the system comprising:
a plurality of magnetic signature minesweeping devices, arranged in an array, each of the plurality of magnetic signature minesweeping devices having an interface unit to interface at least one of the plurality of magnetic signature minesweeping devices to at least one adjacent minesweeping device in the array, at least one of the plurality of magnetic signature minesweeping devices to receive current input and the interface unit comprises an electrical output for power take-off to the at least one adjacent minesweeping device in the array, the plurality of magnetic signature minesweeping devices further including:
a superconducting material magnet;
a power supply connection to supply a driving current for the superconducting material magnet;
a control unit to control a magnetic output of the superconducting magnet; and
a heading sensor in communication with the control unit to monitor a magnetic heading of the device, the control unit being further arranged to control the magnetic output of the superconducting material magnet responsive to the magnetic heading, and to cause different magnetic outputs to be provided for different magnetic headings.

21. A plurality of magnetic signature minesweeping devices as claimed in claim 20, wherein the interface unit is arranged such that the power take-off is facilitated via a tow and power cable connection between each of the plurality of magnetic signature minesweeping devices.

22. A plurality of devices as claimed in claim 20, wherein the interface unit further comprises a control interface, whereby the control unit of the one of the plurality of magnetic signature minesweeping devices is capable of controlling the magnetic output of another one of the plurality of minesweeping devices.

23. A method of magnetic signature minesweeping comprising:
towing a minesweeping device through water;
supplying a driving current to a superconducting material magnet in the minesweeping device when the minesweeping device is towed through the water; and
utilizing a heading sensor located within the minesweeping device to monitor the magnetic heading of the minesweeping device and control a magnetic output of the superconducting magnet to provide different magnetic outputs for different headings.

24. A method as claimed in claim 23, wherein the minesweeping device comprises a turbine power generator to provide a power output comprising said driving current for the superconducting magnet, and wherein the method comprises controlling the power output of the turbine power generator to thereby control the magnetic output of the superconducting magnet.

25. A method as claimed in claim 24, wherein the method further comprises monitoring both the magnetic output of the superconducting magnet and the power output of the turbine power generator, and supplying feedback signals for the controlling of the magnetic output and the power output, whereby the magnetic output and power output can be optimised for a specific mine countermeasure task.

26. A method as claimed in claim 24, wherein the turbine power generator comprises adjustable pitch blades, whereby drag characteristics of the turbine power generator are adjustable.

27. A method as claimed in claim 23, wherein the superconducting material magnet is disposed as a three-axis magnetic source.

28. A method as claimed in claim 27, further comprising a power supply, the power supply being a water driven turbine power generator to supply the driving current when the minesweeping device is towed through water.

29. A method as claimed in claim 23 including arranging the superconducting material magnet such that it exhibits a permanent magnetic output component and a variable magnetic output component to represent permanent and induced components of a vessel's magnetic signature.

30. A method as claimed in claim 23, wherein the method further comprises varying the magnetic output as a function of time and/or position, to facilitate generating desired magnetic signatures for simulating vessels.

31. A method of magnetic signature minesweeping using a plurality of minesweeping devices that each includes a superconducting material magnet, the method comprising:
supplying a driving current for the superconducting material magnets;
utilizing a heading sensor located within the minesweeping device to monitor an overall magnetic heading of the plurality of minesweeping devices;
controlling a magnetic output of the superconducting magnets to automatically provide different magnetic outputs for different headings; and
interfacing the minesweeping devices, wherein the interfacing comprises an electrical output for power take-off from a first of the plurality of minesweeping devices to another of the plurality of minesweeping devices so as to provide the driving current for the superconducting material magnet of the other minesweeping device.

32. A method as claimed in claim 31, further comprising a power supply, the power supply being a water driven turbine power generator to supply the driving current when the minesweeping device is towed through water.

33. A magnetic signature minesweeping arrangement comprising:
an array of minesweeping devices configured to be towed in a serial array, each of the minesweeping devices including a superconducting material magnet;
at least one of the minesweeping devices including a water driven turbine power generator arranged to power a plurality of the minesweeping devices;
a controller to control an overall direction of a magnetic output from the superconducting material magnet of each minesweeping device in response to a determination of a magnetic heading of the magnetic signature minesweeping arrangement; and
a heading sensor located in the magnetic signature minesweeping device, the heading sensor in communication with the control unit to monitor the magnetic heading of the device.

* * * * *

UNITED STATES PATENT AND TRADEMARK OFFICE
CERTIFICATE OF CORRECTION

PATENT NO. : 7,658,149 B2  Page 1 of 1
APPLICATION NO. : 10/539538
DATED : February 9, 2010
INVENTOR(S) : Alan Theobald et al.

It is certified that error appears in the above-identified patent and that said Letters Patent is hereby corrected as shown below:

In column 1, line 36, delete "sport" and insert -- transport --, therefor.

In column 6, line 34, delete "tailing" and insert -- trailing --, therefor.

In column 6, line 56, delete "characterstics" and insert -- characteristics --, therefor.

In column 7, line 45, delete "describe." and insert -- described. --, therefor.

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,658,149 B2 |
| APPLICATION NO. | : 10/539538 |
| DATED | : February 9, 2010 |
| INVENTOR(S) | : Theobald et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 410 days.

Signed and Sealed this

Twenty-eighth Day of December, 2010

David J. Kappos
*Director of the United States Patent and Trademark Office*